(12) United States Patent
Uniyal

(10) Patent No.: US 12,720,438 B2
(45) Date of Patent: Aug. 25, 2026

(54) SYSTEM AND METHOD FOR IMPROVING BATTERY LIFE OF A USER EQUIPMENT (UE) IN A 5G NETWORK

(71) Applicant: Boost SubscriberCo L.L.C., Englewood, CO (US)

(72) Inventor: Manish Uniyal, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 317 days.

(21) Appl. No.: 18/617,431

(22) Filed: Mar. 26, 2024

(65) Prior Publication Data

US 2025/0310890 A1 Oct. 2, 2025

(51) Int. Cl.
*H04W 52/02* (2009.01)

(52) U.S. Cl.
CPC ... *H04W 52/0261* (2013.01); *H04W 52/0225* (2013.01)

(58) Field of Classification Search
CPC ............... H04W 52/283; H04W 48/04; H04W 52/0235; H04W 64/003; H04W 52/02; H04W 52/367; H04W 52/0261; H04W 4/02; H04W 4/029; H04W 4/021
See application file for complete search history.

(56) References Cited

U.S. PATENT DOCUMENTS

2021/0329556 A1* 10/2021 Kim .................. H04W 52/0229

OTHER PUBLICATIONS

The 5G Evolution: The 3rd Generation Partnership Project (3GPP) Releases 16-17, Article, Jan. 2020, pp. 1-54.
Dylan Mcgrath, Release 16: Enhancements in Power Savings Can Make Your Day, Article, Nov. 25, 2020, pp. 1-9.
Huang Shuo, How 5G Can Improve The Battery Life of User Equipment, Article, May 19, 2022, pp. 1-6.
3rd Generation Partnership Project; Technical Specification Group Radio Access Network; Study on Low-power Wake Up Signal and Receiver for NR (Release 18), Report, Dec. 2023, pp. 1-251.
3rd Generation Partnership Project; Technical Specification Group Radio Access Network; NR; Study on User Equipment (UE) Power Saving in NR (Release 16), Report, Jun. 2019, pp. 1-53.
The 5G Evolution: The 3rd Generation Partnership Project (3GPP) Releases 16-17, Article, Mar. 1, 2018, pp. 1-54.

* cited by examiner

*Primary Examiner* — Gary Lafontant
(74) *Attorney, Agent, or Firm* — Kilpatrick Townsend & Stockton LLP

(57) ABSTRACT

A processor obtains information related to UE power saving methods implemented by a wireless network in a particular region and determines a number of UE power saving methods implemented in the particular region. The processor determines a power optimization score for the particular region based on the number of UE power saving methods implemented in the particular region. If the power optimization score is lower than a threshold, the processor generates a recommendation to improve UE power optimization in the particular region.

20 Claims, 3 Drawing Sheets

SYSTEM AND METHOD FOR IMPROVING BATTERY LIFE OF A USER EQUIPMENT (UE) IN A 5G NETWORK

TECHNICAL FIELD

The present disclosure relates generally to wireless communications, and more specifically to a system and method for improving battery life of a user equipment (UE) in a $5^{th}$ Generation (5G) network.

BACKGROUND

User Equipment (UE) power consumption and battery life rank high in the user experience. Power consumption of devices in a network is a challenge as battery life is limited. While the battery capacity and charging speeds are increasing, it is still important to find ways to optimize the battery consumption to maximize operating time of UEs. With the transition to $5^{th}$ Generation (5G) wireless networks, power consumption is a much more relevant factor for non-smartphone UEs such as Internet of Things (IoT) devices and sensors. UEs operating in a 5G network consume more power as compared to other legacy radio access technologies (RATs).

SUMMARY

The system and methods implemented by the system as disclosed in the present disclosure provide an intelligent technique to improve UE power optimization in a wireless cellular network.

The disclosed system and methods provide several practical applications and technical advantages. For example, the disclosed system and method provide the practical application of determining UE power optimization in a region served by a wireless cellular network and improving UE power optimization in the region when the UE power optimization is found sub-optimal. As described in embodiments of the present disclosure a performance server obtains information relating to UE power saving methods implemented by a 5G wireless network in a particular region served by the 5G wireless network. Based on the obtained information, the performance server determines a number of UE power saving methods that are implemented in the particular region and determines a power optimization score for the particular region based on the number of UE power saving methods implemented in the particular region. When the power optimization score is found to be lower than a power optimization threshold, the performance server determines that UE power optimization in the particular region is sub-optimal and generates a recommendation to implement one or more UE power saving methods in the particular region that are not already implemented in the particular region, to improve the UE power optimization in the particular region.

By improving UE power optimization in a particular region served by the 5G cellular network, the disclosed system and method improves UE battery life of UEs operating in the region, which in turn improves UE performance.

Thus, the disclosed system and methods generally improve the technology related to cellular networks and communication using such networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
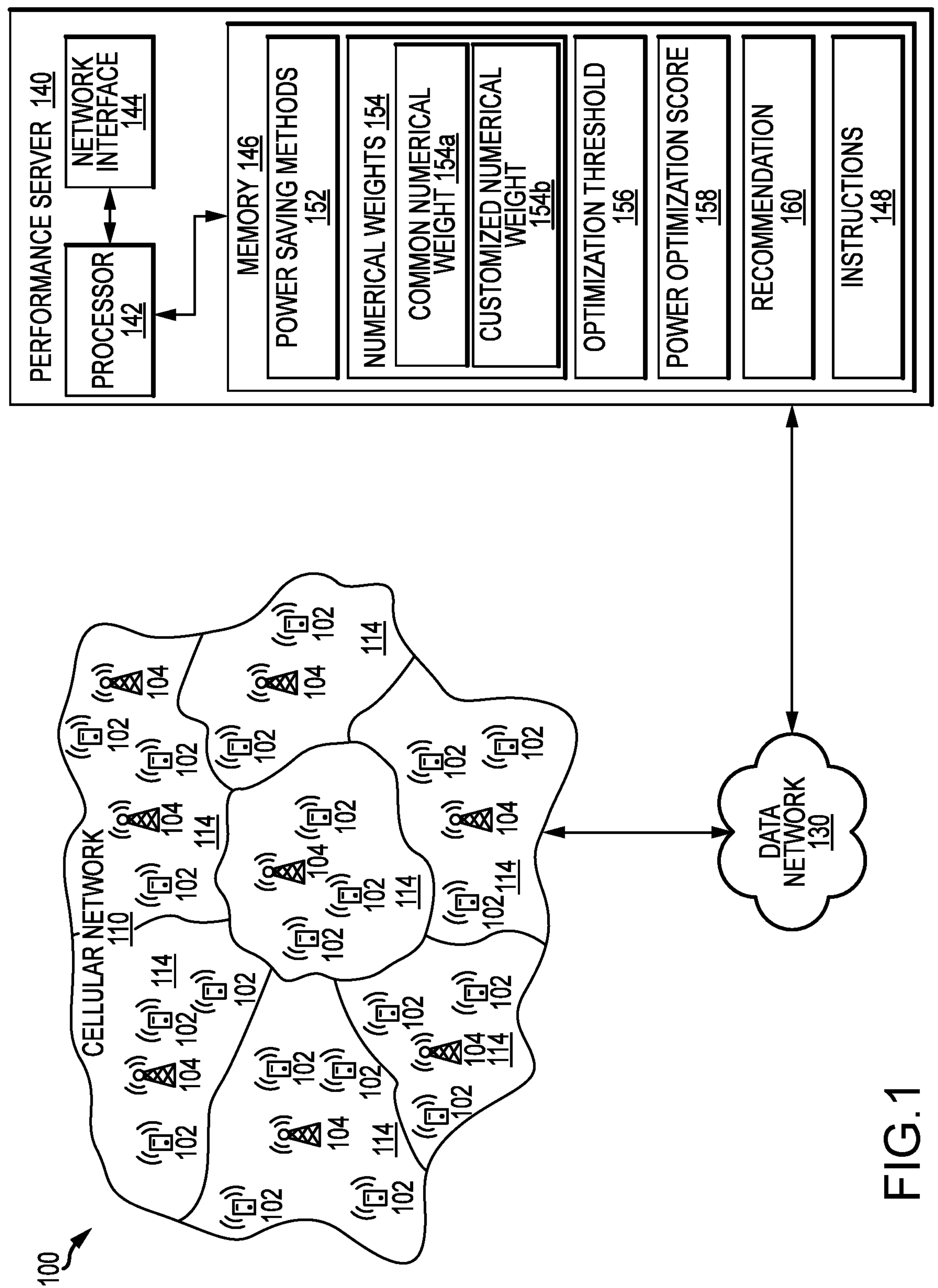
FIG. 1 illustrates a system in accordance with embodiments of the present disclosure.

FIG. 1 illustrates an example system 100, in accordance with embodiments of the present disclosure. As shown in FIG. 1, system 100 may include a wireless cellular network 110 and a performance server 140, each connected to a data network 130. In one embodiment, the cellular network 110 is a $5^{th}$ Generation (5G) Stand Alone (SA) Open Radio Access Network (O-RAN). It may be noted that references to the cellular network 110 may correspond to $5^{th}$ Generation (5G) Stand Alone (SA) Open Radio Access Network (O-RAN). The cellular network 110 may include a plurality of cell sites 104 deployed across a plurality of geographical regions 114. In one embodiment, each cell site 104 may include a base station consisting of a base station tower having one or more radio antennas mounted thereon. A base station tower, often also referred to as a cell tower, is a fixed radio transceiver that is capable of sending and receiving wireless signals and is the main communication point for user equipment (UEs) 102. It may be noted that the terms "base station tower" and "cell tower" may be used interchangeably throughout this disclosure. A cell site 104 generally provides radio cellular coverage in a specific coverage area in the vicinity of the cell site 104, the coverage area generally referred to as a cell serving area. UEs 102 that are located within the coverage area of a particular cell site 104 may wirelessly connect to the base station tower of the cell site 104 and access services provided by the cell site 104. Depending on a size of a geographical region 114, one or more cell sites 104 may be deployed to provide cell coverage to the entire geographical region 114. A region 114 may include a particular zip code, a city, a county, a state, a country or portions thereof.

In the context of $5^{th}$ Generation (5G) New Radio (NR), a base station of a cell site 104 may be referred to as a gNodeB or gNB. It may be noted that the terms "base station" and "gNodeB" may be used interchangeably throughout this disclosure. A base station may provide a UE 102 connected to the base station access to a 5G core (not shown) which in turn provides the UE 102 access to the data network 130. For example, the base station may be part of a 5G NR cellular network. A cell site 104 may serve a particular geographical area or cell, with other base stations serving neighboring geographical areas or neighboring cells that at least partially overlap. Services provided by the cellular network 110 may include telephone calls, network access (e.g., access to data network 130), data reporting, text messaging services, etc. Such services may generally rely on packetized data being exchanged between the UE 102 and a base station at a cell site 104.

While cellular network 110 is described in the context of a 5G NR radio network (e.g., 5G SA O-RAN that uses gNodeBs as base stations, the embodiments detailed herein can be applicable to other types of cellular networks, such as a 4G Long Term Evolution (LTE) cellular network, that uses eNodeBs in place of gNodeBs. In one or more embodiments, cellular network 110 operates according to the 5G NR radio access technology (RAT). In other embodiments, a different RAT may be used, such as 3G, 4G Long Term Evolution (LTE), or some other RAT. In some other embodiments, as shown in FIG. 1, the cellular network 110 may use a 5G core. In some embodiments, the cellular network 110 may use an evolved packet core (EPC) instead of or in addition to the 5G core.

UE 102 may be one of various forms of wireless devices that are capable of communication according to the radio access technology (RAT) of the cellular network 110. For instance, UE 102 can be a smartphone, wireless modem, cellular phone, laptop computer, wireless access point (APs), etc.

The data network 130, in general, may be a wide area network (WAN), a personal area network (PAN), a cellular network, or any other technology that allows devices to communicate electronically with other devices. In one or more embodiments, the data network 130 may be the Internet.

In one or more embodiments, the performance server 140 may be implemented by a computing device running one or more software applications. For example, the performance server 140 may be representative of a computing system that is hosting software applications that may be installed and run locally or may be used to access software applications running on the performance server 140. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, the performance server 140 may be representative of a server running one or more software applications to implement respective functionality as described below. In certain embodiments, the performance server 140 may run a thin client software application where the processing is directed by the thin client but largely performed by a central entity such as a central server (not shown).

The performance server 140 includes a processor 142, a memory 146, and a network interface 144. The performance server 140 may be configured as shown in FIG. 1 or in any other suitable configuration.

The processor 142 includes one or more processors operably coupled to the memory 146. The processor 142 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the memory 146. The one or more processors are configured to process data and may be implemented in hardware or software. For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 148 to implement the performance server 140. In this way, processor 142 may be a special-purpose computer designed to implement the functions disclosed herein. In one or more embodiments, the performance server 140 is implemented using logic units, FPGAs, ASICs, DSPs, or any other suitable hardware. The performance server 140 is configured to operate as described with reference to FIG. 3. For example, the processor 142 may be configured to perform at least a portion of the method 300 as described in FIG. 3.

The memory 146 comprises a non-transitory computer-readable medium such as one or more disks, tape drives, or solid-state drives, and may be used as an over-flow data storage device, to store programs when such programs are selected for execution, and to store instructions and data that are read during program execution. The memory 146 may be volatile or non-volatile and may comprise a read-only memory (ROM), random-access memory (RAM), ternary content-addressable memory (TCAM), dynamic random-access memory (DRAM), and static random-access memory (SRAM).

The memory 146 is operable to store power saving methods 152, numerical weights 154, optimization threshold 156, power optimization scores 158, recommendations 160, and instructions 148. The instructions 148 may include any suitable set of instructions, logic, rules, or code operable to execute the performance server 140.

The network interface 144 is configured to enable wired and/or wireless communications. The network interface 144 is configured to communicate data between the performance server 140 and other devices, systems, or domains (e.g., cellular network 110). For example, the network interface 144 may comprise a Wi-Fi interface, a LAN interface, a WAN interface, a modem, a switch, or a router. The processor 142 is configured to send and receive data using the network interface 144. The network interface 144 may be configured to use any suitable type of communication protocol as would be appreciated by one of ordinary skill in the art.

It may be noted that each UE 102, may be implemented similar to the performance server 140. For example, a UE 102 may include a processor and a memory storing instructions to implement the respective functionality of the UE 102 when executed by the processor.

In one or more embodiments, the performance server 140 may have access to information relating to a plurality of UE power saving methods 152 that are defined by 3GPP standards for implementation in the cellular network 110 or portions thereof. In this context, the 3GPP standards relating to 5G networks have defined several UE power saving methods 152 that may be implemented by a cellular network operator in one or more regions 114 serviced by the 5G cellular network 110.

In one example UE power saving method 152, the 3GPP standards for 5G networks define a Radio Resource Control (RRC) inactive state. Generally, a UE 102 can access network services only if it establishes a RRC connection with the base station. In legacy Radio Access Technologies (RATs), a UE is either in the RRC_CONNECTED state (it has an RRC connection) or the RRC_IDLE state (it does not have an RRC connection). However, transitioning from the RRC_IDLE state to the RRC_CONNECTED state takes a long time, so it cannot meet the low latency requirement of some 5G services. However, a UE cannot just stay in the RRC_CONNECTED state because this will consume much more UE power. To solve this problem, 5G introduces the RRC_INACTIVE state, where the RRC connection is released but the UE context is retained (called RRC Release with Suspend), so an RRC connection can be quickly resumed when needed. This way, a UE in the RRC_INACTIVE state can access low-latency services whenever needed but consume the same amount of power as it does in the RRC_IDLE state.

In another example UE power saving method 152, the 3GPP standards for 5G networks define a wakeup signal. The wakeup signal was initially introduced in 3GPP Release 15. A paging signal sent over the physical downlink shared channel (PDSCH) literally wakes the UE from an idle state informing it to prepare to receive data. The wakeup signal enables the UE's main receiver and most of its resources to remain in an idle state until required, dramatically reducing current draw. Most UEs can be configured for discontinuous reception (DRX) which includes remaining in an idle state for a certain period and waking up periodically to check for traffic on the PDSCH. Currently, when configured for a long DRX period, the UE wakes up at the scheduled time and stays awake for the entire duration of the configured "on" period. Release 16 introduces a new downlink control information (DCI) format that can be read by the UE before the long DRX wakeup time. This short DCI can inform the UE if there is no relevant downlink traffic on the PDSCH, enabling it to return immediately to an idle state through the next "on" duration. The wakeup signal may have only minimal impact on the power consumption of a smartphone. However, the wakeup signal may have a much more significant effect on the power consumption of non-smartphone UEs such as IoT devices and sensors, many of which by design remain in an idle state for long periods (e.g., weeks, months, or even years) waking up only to transmit or receive information only when an event occurs.

In another example UE power saving method 152, the 3GPP standards for 5G networks define enhanced cross-slot scheduling. 3GPP Release 15 introduced the concept of flexibility and scalability in the transmission frame structure to help support the many new and diverse use cases expected in 5G, including ultra-reliable low-latency communications (URLLC), massive machine-type communications (mMTC), and enhanced mobile broadband (eMBB). A standard slot can be broken down into mini-slots that are 2-, 4-, or 7-orthogonal frequency division multiple access (OFDM) symbols long. Using a mechanism known as dynamic-time division duplex (TDD), 5G New Radio networks dynamically balance uplink and downlink traffic requirements and include control and acknowledgment messages within the same subframe. Release 16 adds the concept of enhanced cross-slot scheduling, which enables a UE to go into a microsleep state, rather than performing some non-essential decoding tasks, if applicable. A new bit field in some DCI formats informs the UE in advance if the time between the uplink or downlink control information slot and data slots is sufficient to enable microsleep, an intermediate low-power state that reduces current draw without impacting performance.

In another example UE power saving method 152, the 3GPP standards for 5G networks define adaptive multiple-input/multiple-output (MIMO) layer reduction. 5G New Radio (NR) makes use of massive MIMO technology to dramatically increase throughput. By utilizing dozens or even hundreds of antennas, massive MIMO employs dozens or even hundreds of base station antenna elements to stream data to multiple users, offering approximately 50 times the spectral efficiency of a single-input, single-output system. The use of MIMO requires more resources and thus, causing greater power consumption than the single input, single-output system. Adaptive MIMO layer reduction defined in Release 16 creates the ability to adaptively reduce the number of downlink MIMO layers in a transmission, saving the UE a significant amount of power by allowing the UE to reduce the number of antennas in use. For example, the initial bandwidth part, which is set of contiguous common physical resource blocks (PRBs), can be configured for a single MIMO layer, while other bandwidth parts could use a higher number of MIMO layers. The adaption of the maximum number of downlink MIMO layers is done on a per-bandwidth part basis. Similar gains can also be obtained in the uplink by restricting the maximum number of MIMO layers, enabling the UE to turn off certain transmitters and reduce power consumption.

In another example UE power saving method 152, the 3GPP standards for 5G networks define relaxed radio resource management (RRM) measurement. Measuring radio resource management (RRM) is critical to ensuring the efficient use of available network resources. It is generally a very power-intensive activity. In 5G, cell signal measurements use synchronization signal block (SSB) beams to measure things like channel quality, signal strength, and signal power. 3GPP Release 16 enables the UE to reduce the number and frequency of RRM measurements for signals from the cell it is connected to and neighboring cells. The criteria for relaxing these measurements include maintaining a relative proximity to the cell the UE is connected to and maintaining reference signal received power (RSRP), reference signal received quality (RSRQ), and signal-to-interference-plus-noise ratio (SINR) within a given threshold. Specific criteria for relaxed RRM measurement are determined by the network that the UE is operating on.

It may be noted that the UE power saving methods 152 described above is not an exhaustive list of UE power saving methods 152 and that the embodiments of the present disclosure apply to any number of power saving methods 152 presently described by the 3GPP standards and/or to be added to the 3GPP standards at a later time. For example, the method for determining the power optimization score 158 described in embodiments of the present disclosure may be adapted to any number of UE power saving methods 152 that may be implemented in the cellular network 110.

While several UE power saving methods are defined by 3GPP 5G standards, the network operator is not obligated to implement all or any of the UE power saving methods defined by the 3GPP 5G standards. Thus, typically a network operator may choose to selectively implement one or more of the UE power saving methods 152 in certain regions 114 serviced by the cellular network 110. This means that while some regions 114 may be UE power optimized, other regions 114 may have sub-optimal UE power optimization.

Embodiments of the present disclosure describe techniques for determining a degree of UE power optimization implemented in a particular region 114 serviced by the cellular network 110 and improving UE power optimization when the degree of UE power optimization is sub-optimal.

In one or more embodiments, the performance server 140 may have access to data that indicates UE power saving methods 152 implemented and working in the cellular network 110. For example, the performance server 140 may monitor one or more parameters that indicate whether a particular UE power saving method 152 is implemented and working in a particular region 114 serviced by the cellular network 110. In one embodiment, the network operator may store, in the memory 146 and/or in a separate database (not shown) accessible to the performance server 140, information relating to the UE power saving methods 152 that are implemented by the network operator of the cellular network 110 in regions 114 served by the cellular network 110. The performance server 140 may access this database to determine region wise implementation of UE power saving methods 152. Additionally or alternatively, in a particular region 114 served by the cellular network 110, the performance server 140 may monitor one or more parameters that indicate whether a particular UE power saving method 152 that has been implemented in the region is actually operational.

For example, the performance server 140 may access information (e.g., stored in memory 146 or in a separate database) relating to power saving methods 152 implemented in a particular region 114 serviced by the cellular network 110. Based on this information, the performance server 140 may determine that a particular number (e.g., 1, 2, 3 etc.) of UE power saving methods 152 are implemented by the network operator in the particular region 114. The performance server 140 may be configured to determine a power optimization score 158 for the particular region 114 based on the particular number of UE power saving methods 152 implemented in the particular region 114. In one embodiment, the power optimization score 158 determined for the particular region 114 is proportional to the particular number of power saving methods 152 implemented in the particular region 114. For example, the performance server 140 assigns a higher power optimization score 158 to the particular region 114 when a higher number of UE power saving methods 152 are implemented in the particular region 114.

In one embodiment, to determine the power optimization score 158 for the particular region 114, performance server 140 obtains pre-configured numerical weights 154 (e.g., stored in memory 146) assigned to the UE power saving methods 152. In one embodiment, a common numerical weight **154*a* may be assigned to all power saving methods 152. In this case, the performance server 140 may determine the power optimization score 158 for the particular region 114 by multiplying the common numerical weight 154*a* to the particular number of UE power saving methods 152 that are implemented in the particular region. For example, when the pre-configured common numerical weight 154*a* is 2 and the particular number of UE power saving methods 152 implemented by the cellular network 110 in the particular region 114 is 2, then the power optimization score 158 is calculated as 2×2=4. In one example, assuming that a total of five UE power optimization methods 152 are defined by the 3GPP 5G standards, when no UE power optimization methods are implemented, the power optimization score 158 is 0×2=0, when 1 UE power optimization method is implemented, the power optimization score 158 is 1×2=2, when 2 UE power optimization methods are implemented, the power optimization score 158 is 2×2=2, when 3 UE power optimization methods are implemented, the power optimization score 158 is 3×2=6, when 4 UE power optimization methods are implemented, the power optimization score 158 is 4×2=8, and when 5 UE power optimization methods are implemented, the power optimization score 158** is 5×2=10.

In an additional or alternative embodiment, the performance server 140 may be configured to assign an optimization indicator to the particular region 114 based on the power optimization score 158 determined for the particular region 114, wherein the optimization indicator indicates a degree of UE power optimization in the particular region 114. For example, assuming that a total of five UE power optimization methods 152 are defined by the 3GPP 5G standards, the performance server 140 may be configured to map each power optimization score 158 to one of the optimization indicators including worst, poor, fair, good, better, and best, wherein an optimization indicator of "worst" indicates worst UE power optimization and an optimization indicator of "best" indicates best possible UE power optimization. Following the above example when the predetermined numerical weight is 2, a power optimization score 158 of '0' may map to "worst" optimization indicator, a power optimization score 158 of '2' may map to "poor", a power optimization score 158 of '4' may map to "fair", a power optimization score 158 of '6' may map to "good", a power optimization score 158 of '8' may map to "better", and a power optimization score 158 of '10' may map to "best".

Table-A below illustrates an example of power optimization scores (S) 158 and optimization indicators (I) corresponding to different numbers (N) of power saving methods implemented/operational in a particular region 114 of the cellular network 110. Table A assumes that a maximum of five power saving methods 152 are available for implementation.

TABLE-A

| Number (N) of Power saving methods implemented/operational | Power Optimization Score (S) | Optimization Indicators (I) |
|---|---|---|
| 5 | 10 | Best |
| 4 | 8 | Better |
| 3 | 6 | Good |
| 2 | 4 | Fair |
| 1 | 2 | Poor |
| 0 | 0 | Worst |

The power optimization scores 158 shown in Table-A are calculated as described in the above paragraphs based on a pre-configured common numerical weight **154*a*** of 2.

In an additional or alternative embodiment, each UE power saving method 152 may be mapped to a pre-configured customized numerical weight **154*b*, wherein a higher customized numerical weight 154*b* may be mapped to a particular power saving method 152 that is more effective in saving UE power as compared to other lesser effective power saving methods that are assigned lower customized numerical weights 154*b*. In this case, the performance server 140 obtains information relating to the particular power saving methods 152 implemented in the particular region 114 and assigns respective pre-determined customized numerical weights 154*b* to each of the power saving methods 152 implemented in the particular region 114. The performance server 140 determines the power optimization score 158 for the particular region 114 by adding all the customized numerical weights 154*a* that are assigned to the respective power saving methods 152 implemented in the particular region 114**.

Once the power optimization score 158 is determined for the particular region 114, the performance server 140 compares the power optimization score 158 to a pre-determined optimization threshold 156 and determines whether the power optimization score 158 equals or exceeds the optimization threshold 156. The optimization threshold 156 is a particular numerical score that indicates an acceptable level of UE power optimization in the particular region 114. When the power optimization score 158 is lower than the optimization threshold 156, the performance server 140 determines that UE power optimization in the particular region 114 is sub-optimal.

In one or more embodiments, the performance server 140 may be configured to determine whether one or more UE power optimization methods 152 that are implemented by the cellular network 110 within the particular region 114 are actually operational and working. The performance server 140 is configured to determine the power optimization score 158 based only on those power optimization methods 152 that are found to be operational within the particular region 114. For example, the performance server 140 may have access to one or more parameters (e.g., UE battery power of UEs within the particular region 114, signaling and other data exchanges between UEs and base station towers within the particular region 114, etc.) that may indicate whether a particular UE power saving method 152 that is implemented in the particular region 114 is operational. Once the performance server 140 identifies the particular power saving methods 152 that are implemented by the cellular network 110 in the particular region 114, the performance server 140 may be configured to monitor the one or more parameters associated with performance of each UE power saving method 152 and determine whether the UE power saving method 152 is operational in the particular region 114 and working as designed. Once the performance server 140 has determined (e.g., based on the parameters associated with the power saving methods 152) which ones of the power saving methods 152 that are implemented in the particular region 114 are operational, the performance server 140 determines a power optimization score 158 based only on those power saving methods 152 that are determined to be operational in the particular region 114. The power optimization score 158 that is determined based only on those power saving methods 152 that are determined to be operational in the particular region 114 may be different from the power optimization score 158 described above that is determined based on all power saving methods 152 that are implemented in the particular region 114 regardless of whether they are actually operational in the particular region 114. As this power optimization score 158 is based only on those power saving methods 152 that are operational in the particular region 114, it is a more accurate representation of UE power optimization in the particular region 114.

It may be noted that the manner in which the power optimization score 158 based on operational power saving methods 152 is calculated is same as the method described in the above paragraphs. For example, assuming that a common numerical weight 154*a* of '2' applies to all power saving methods 152, when only two out of three power saving methods 152 are found operational in the particular region 114, the performance server 140 determines the power optimization score 158 for the particular region 114 as 2×2=4 which may map to an optimization indication of "Fair" as described above. In one embodiment, once a power optimization score 158 based only on operational UE power saving methods 152 is determined, the performance server 140 may be configured to compare the power optimization score 158 to the pre-determined optimization threshold 156 and determines whether the power optimization score 158 equals or exceeds the optimization threshold 156. Upon determining, based on the comparison, that the power optimization score 158 is lower than the optimization threshold 156, the performance server 140 determines that UE power optimization in the particular region 114 is sub-optimal. In response to determining that the UE power optimization in the particular region 114 is sub-optimal, the performance server 140 may identify those power saving methods 152 that were found to be implemented in the particular region 114 but are non-operational. The performance server 140 may generate an alert message that includes information relating to the power saving methods 152 that are implemented but not operational in the particular region 114. The alert may allow a support personnel to analyze and resolve any errors that are causing the power saving methods 152 to malfunction in the particular region 114.

In one or more embodiments, the performance server 140 may be configured to determine the power optimization scores 158 for a plurality of regions 114 served by the cellular network 110 and determine one or more regions 114 whose UE power optimization is determined as sub-optimal based on the method described above. In response to determining that UE power optimization in one or more regions 114 is sub-optimal, the performance server 140 may be configured to generate a recommendation 160 for each of the one or more regions 114, wherein the recommendation 160 relates to implementing one or more power saving methods in each region 114 that is not already implemented in the region 114, to improve UE power optimization in the one or more regions 114.

Figure 2:
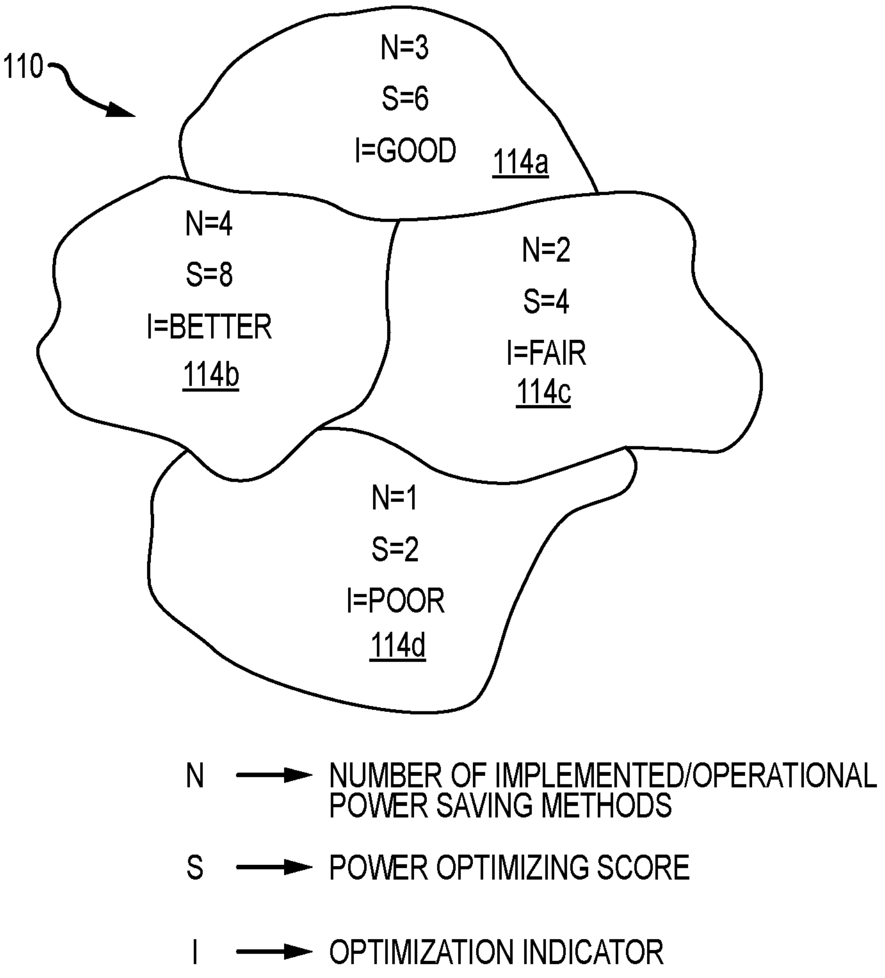
FIG. 2 illustrates region wise power optimization scores and optimization indicators within regions of an example portion of the cellular network, in accordance with one or more embodiments of the present disclosure.

FIG. 2 illustrates region wise power optimization scores 158 and optimization indicators within regions 114 of an example portion of the cellular network 110, in accordance with one or more embodiments of the present disclosure. As shown in FIG. 2, the example portion of the cellular network 110 includes regions 114*a*, 114*b*, 114*c* and 114*d*. For each region 114*a*-114*d*, FIG. 2 illustrates a number (N) of power saving methods 152 implemented and/or operational in the region, an optimization score (S) 158 associated with the region, and an optimization indicator (I) associated with the region. It may be noted that the values of N, S, and I are in accordance with the example Table-A described above. For example, in region 114*a*, N=3 which indicates that three power optimization methods 152 are implemented/operational in region 114*a*. As shown in Table-A, N=3 corresponds to a power optimization score S=6 and an optimization indicator I="Good". In region 114*b*, N=4, which according to Table-A, corresponds to S=8 and I="Better". In region 114*c*, N=2, which according to Table-A, corresponds to S=4 and I="Fair". In region 114*d*, N=1, which according to Table-A, corresponds to S=2 and I="Poor". In the example shown in of FIG. 2, when the power optimization score 158 S=6, the performance server 140 may determine that UE power optimization in regions 114*c* and 114*d* (which have power optimization scores lower than S=6) is sub-optimal, and accordingly generate a recommendation 160 as described above.

Figure 3:
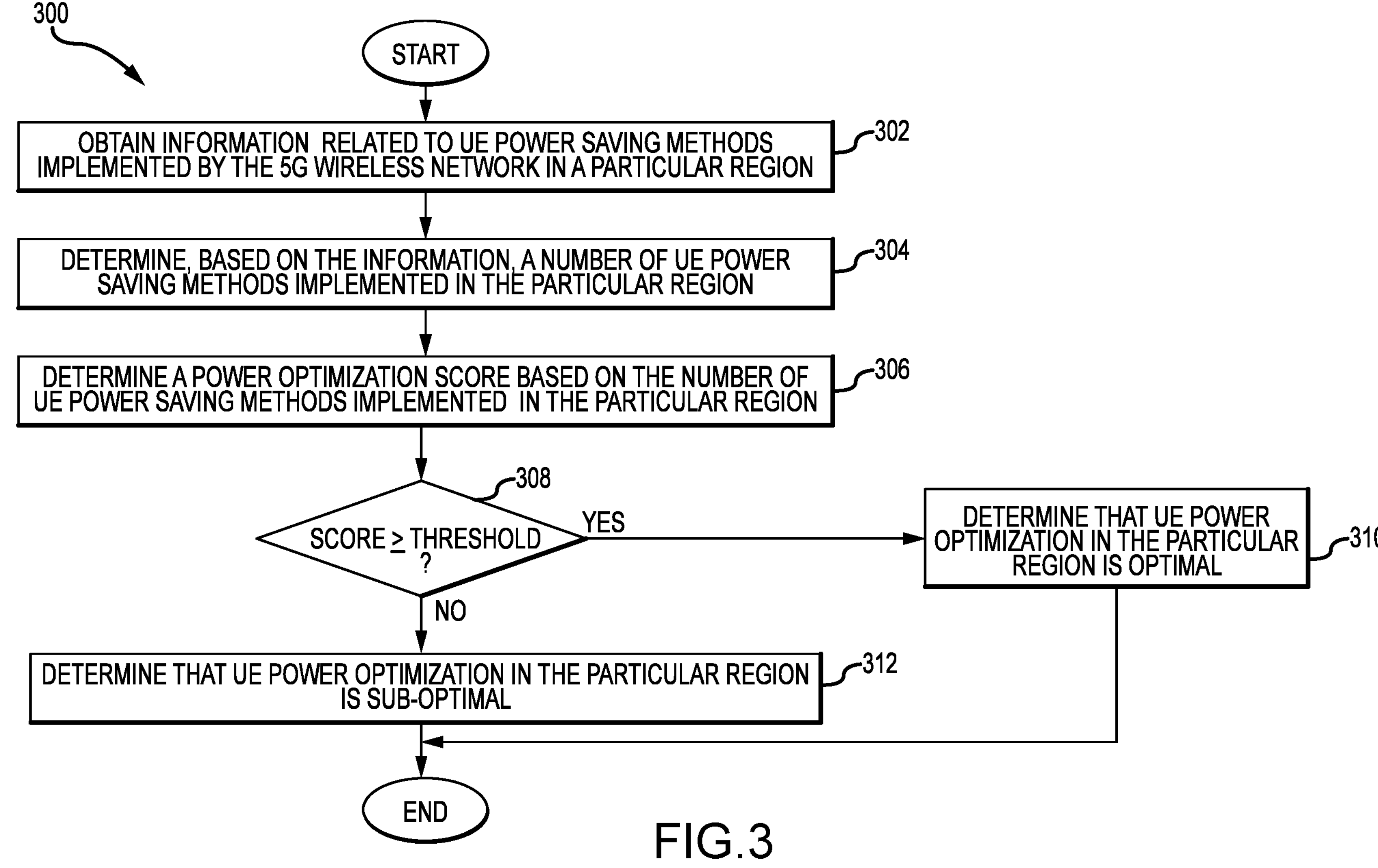
FIG. 3 is a flowchart of an example method for monitoring and improving UE power optimization in a wireless cellular network, in accordance with embodiments of the present disclosure.

FIG. 3 is a flowchart of an example method 300 for monitoring and improving UE power optimization in a cellular network 110, in accordance with embodiments of the present disclosure. Method 300 may be performed by the performance server 140 as shown in FIG. 1 and described above.

At operation 302, the performance server 140 obtains information related to UE power saving methods implemented by the 5G wireless network in a particular region served by the 5G wireless network (e.g., wireless cellular network 110).

As described above, the performance server 140 may have access to data that indicates UE power saving methods 152 implemented in the cellular network 110. In one embodiment, the network operator may store, in the memory 146 and/or in a separate database (not shown) accessible to the performance server 140, information relating to the UE power saving methods 152 that are implemented by the network operator of the cellular network 110 in regions 114 served by the cellular network 110. The performance server 140 may access this database to determine region wise implementation of UE power saving methods 152. Additionally or alternatively, in a particular region 114 served by the cellular network 110, the performance server 140 may monitor one or more parameters that indicate whether a particular UE power saving method 152 that has been implemented in the region is actually operational.

At operation 304, the performance server 140 determines, based on the information, a number of UE power saving methods implemented in the particular region.

As described above, the performance server 140 may access information (e.g., stored in memory 146 or in a separate database) relating to power saving methods 152 implemented in a particular region 114 serviced by the cellular network 110. Based on this information, the performance server 140 may determine that a particular number (e.g., 1, 2, 3 etc.) of UE power saving methods 152 are implemented by the network operator in the particular region 114.

At operation 306, the performance server 140 determines a power optimization score for the particular region based on the number of UE power saving methods implemented in the particular region, wherein the power optimization score is proportional to the number of power saving methods implemented in the particular region.

As described above, the performance server 140 may be configured to determine a power optimization score 158 for the particular region 114 based on the particular number of UE power saving methods 152 implemented in the particular region 114. In one embodiment, the power optimization score 158 determined for the particular region 114 is proportional to the particular number of power saving methods 152 implemented in the particular region 114. For example, the performance server 140 assigns a higher power optimization score 158 to the particular region 114 when a higher number of UE power saving methods 152 are implemented in the particular region 114.

In one embodiment, to determine the power optimization score 158 for the particular region 114, performance server 140 obtains pre-configured numerical weights 154 (e.g., stored in memory 146) assigned to the UE power saving methods 152. In one embodiment, a common numerical weight 154*a* may be assigned to all power saving methods 152. In this case, the performance server 140 may determine the power optimization score 158 for the particular region 114 by multiplying the common numerical weight 154*a* to the particular number of UE power saving methods 152 that are implemented in the particular region. For example, when the pre-configured common numerical weight 154*a* is 2 and the particular number of UE power saving methods 152 implemented by the cellular network 110 in the particular region 114 is 2, then the power optimization score 158 is calculated as $2 \times 2 = 4$. In one example, assuming that a total of five UE power optimization methods 152 are defined by the 3GPP 5G standards, when no UE power optimization methods are implemented, the power optimization score 158 is $0 \times 2 = 0$, when 1 UE power optimization method is implemented, the power optimization score 158 is $1 \times 2 = 2$, when 2 UE power optimization methods are implemented, the power optimization score 158 is $2 \times 2 = 2$, when 3 UE power optimization methods are implemented, the power optimization score 158 is $3 \times 2 = 6$, when 4 UE power optimization methods are implemented, the power optimization score 158 is $4 \times 2 = 8$, and when 5 UE power optimization methods are implemented, the power optimization score 158 is $5 \times 2 = 10$.

In an additional or alternative embodiment, each UE power saving method 152 may be mapped to a pre-configured customized numerical weight 154*b*, wherein a higher customized numerical weight 154*b* may be mapped to a particular power saving method 152 that is more effective in saving UE power as compared to other lesser effective power saving methods that are assigned lower customized numerical weights 154*b*. In this case, the performance server 140 obtains information relating to the particular power saving methods 152 implemented in the particular region 114 and assigns respective pre-determined customized numerical weights 154*b* to each of the power saving methods 152 implemented in the particular region 114. The performance server 140 determines the power optimization score 158 for the particular region 114 by adding all the customized numerical weights 154*a* that are assigned to the respective power saving methods 152 implemented in the particular region 114.

At operation 308, the performance server 140 determines whether the power optimization score determined for the particular region equals or exceeds a pre-determined threshold.

As described above, once the power optimization score 158 is determined for the particular region 114, the performance server 140 compares the power optimization score 158 to a pre-determined optimization threshold 156 and determines whether the power optimization score 158 equals or exceeds the optimization threshold 156. The optimization threshold 156 is a particular numerical score that indicates an acceptable level of UE power optimization in the particular region 114. When the power optimization score 158 is determined to equal or exceed the optimization threshold 156, the method 300 proceeds to operation 310, where the performance server 140, in response to determining that the power optimization score equals or exceeds the threshold, determines that UE power optimization in the particular region is optimal.

On the other hand, when power optimization score 158 is determined to be lower than the optimization threshold, method 300 proceeds to operation 312.

At operation 312, in response to determining that the power optimization score is lower than the threshold, the performance server 140 determines that UE power optimization in the particular region is sub-optimal.

In certain embodiments, in response to determining that the UE power optimization in the particular region 114 is sub-optimal, the performance server 140 may identify those power saving methods 152 that were found to be implemented in the particular region 114 but are non-operational. The performance server 140 may generate an alert message that includes information relating to the power saving methods 152 that are implemented but not operational in the particular region 114. The alert may allow a support personnel to analyze and resolve any errors that are causing the power saving methods 152 to malfunction in the particular region 114.

In one or more embodiments, the performance server 140 may be configured to determine the power optimization scores 158 for a plurality of regions 114 served by the cellular network 110 and determine one or more regions 114 whose UE power optimization is determined as sub-optimal based on the method described above. In response to determining that UE power optimization in one or more regions 114 is sub-optimal, the performance server 140 may be configured to generate a recommendation 160 for each of the one or more regions 114, wherein the recommendation 160 relates to implementing one or more power saving methods in each region 114 that is not already implemented in the region 114, to improve UE power optimization in the one or more regions 114.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
- a memory storing a plurality of User Equipment (UE) power saving methods that can be implemented by a wireless network; and
- a processor communicatively coupled to the memory and the wireless network, wherein the processor is configured to:
  - obtain information related to UE power saving methods implemented by the wireless network in a particular region served by the wireless network;
  - determine, based on the information, a number of UE power saving methods implemented in the particular region;
  - determine a power optimization score for the particular region based on the number of UE power saving methods implemented in the particular region, wherein the power optimization score is proportional to the number of power saving methods implemented in the particular region;
  - determine whether the power optimization score determined for the particular region equals or exceeds a pre-determined threshold; and
  - in response to determining that the power optimization score is lower than the pre-determined threshold, generate a recommendation to improve UE power optimization in the particular region.

2. The system of claim 1, wherein the processor is further configured to determine the power optimization score by:
- obtaining a common numerical weight to be assigned to each of the power saving methods implemented in the particular region; and
- determine the power optimization score by multiplying the common numerical weight to the number of power saving methods implemented in the particular region.

3. The system of claim 1, wherein the processor is further configured to determine the power optimization score by:
- assigning a pre-determined numerical weight to each power saving method implemented in the particular region; and
- determining the power optimization score by adding the pre-determined numerical weights assigned to the power saving methods implemented in the particular region.

4. The system of claim 1, wherein each power saving method is defined by 3GPP 5G standards.

5. The system of claim 1, wherein the processor is further configured to:
- monitor a network coverage of the wireless network in the particular region;
- determine, based on the monitoring, that one or more power saving methods that are implemented in the particular regions are not operational in the particular region; and
- determine a second power optimization score for the particular region based only on the number of UE power saving methods that are implemented in the particular region and operational.

6. The system of claim 5, wherein the processor is further configured to:
- determine that the second power optimization score is lower than the pre-determined threshold;
- in response to determining that the second power optimization score is lower than the pre-determined threshold, identify the power saving methods that are not operational; and
- generate an alert message that includes information relating to the power saving methods that are not operational in the particular region.

7. The system of claim 1, wherein: the recommendation comprises a recommendation for implementing in the particular region one or more power saving methods that are not already implemented in the particular region.

8. A method for improving UE power optimization in a wireless network comprising:
- obtaining information related to UE power saving methods implemented by the wireless network in a particular region served by the wireless network;
- determining, based on the information, a number of UE power saving methods implemented in the particular region;
- determining a power optimization score for the particular region based on the number of UE power saving methods implemented in the particular region, wherein the power optimization score is proportional to the number of power saving methods implemented in the particular region;
- determining whether the power optimization score determined for the particular region equals or exceeds a pre-determined threshold; and
- in response to determining that the power optimization score is lower than the pre-determined threshold, generate a recommendation to improve UE power optimization in the particular region.

9. The method of claim 8, wherein determining the power optimization score comprises:

obtaining a common numerical weight to be assigned to each of the power saving methods implemented in the particular region; and determine the power optimization score by multiplying the common numerical weight to the number of power saving methods implemented in the particular region.

10. The method of claim 8, wherein determining the power optimization score further comprises:

assigning a pre-determined numerical weight to each power saving method implemented in the particular region; and determining the power optimization score by adding the pre-determined numerical weights assigned to the power saving methods implemented in the particular region.

11. The method of claim 8, wherein each power saving method is defined by 3GPP 5G standards.

12. The method of claim 8, further comprising:

monitoring a network coverage of the wireless network in the particular region;

determining, based on the monitoring, that one or more power saving methods that are implemented in the particular regions are not operational in the particular region; and determining a second power optimization score for the particular region based only on the number of UE power saving methods that are implemented in the particular region and operational.

13. The method of claim 12, further comprising:

determining that the second power optimization score is lower than the pre-determined threshold;

in response to determining that the second power optimization score is lower than the pre-determined threshold, identifying the power saving methods that are not operational; and generating an alert message that includes information relating to the power saving methods that are not operational in the particular region.

14. The method of claim 8, wherein: the recommendation comprises a recommendation for implementing in the particular region one or more power saving methods that are not already implemented in the particular region.

15. A non-transitory computer-readable medium storing instructions that when executed by a processor cause the processor to:

obtain information related to UE power saving methods implemented by a wireless network in a particular region served by the wireless network;

determine, based on the information, a number of UE power saving methods implemented in the particular region;

determine a power optimization score for the particular region based on the number of UE power saving methods implemented in the particular region, wherein the power optimization score is proportional to the number of power saving methods implemented in the particular region;

determine whether the power optimization score determined for the particular region equals or exceeds a pre-determined threshold; and in response to determining that the power optimization score is lower than the pre-determined threshold, generate a recommendation to improve UE power optimization in the particular region.

16. The non-transitory computer-readable medium of claim 15, wherein determining the power optimization score comprises:

obtaining a common numerical weight to be assigned to each of the power saving methods implemented in the particular region; and determine the power optimization score by multiplying the common numerical weight to the number of power saving methods implemented in the particular region.

17. The non-transitory computer-readable medium of claim 15, wherein determining the power optimization score comprises:

assigning a pre-determined numerical weight to each power saving method implemented in the particular region; and determining the power optimization score by adding the pre-determined numerical weights assigned to the power saving methods implemented in the particular region.

18. The non-transitory computer-readable medium of claim 15, wherein each power saving method is defined by 3GPP 5G standards.

19. The non-transitory computer-readable medium of claim 15, wherein the instructions further cause the processor to:

monitor a network coverage of the wireless network in the particular region;

determine, based on the monitoring, that one or more power saving methods that are implemented in the particular regions are not operational in the particular region; and determine a second power optimization score for the particular region based only on the number of UE power saving methods that are implemented in the particular region and operational.

20. The non-transitory computer-readable medium of claim 19, wherein the instructions further cause the processor to:

determine that the second power optimization score is lower than the pre-determined threshold;

in response to determining that the second power optimization score is lower than the pre-determined threshold, identify the power saving methods that are not operational; and generate an alert message that includes information relating to the power saving methods that are not operational in the particular region.

* * * * *